(12) United States Patent
Vice

(10) Patent No.: US 7,240,704 B1
(45) Date of Patent: Jul. 10, 2007

(54) DADO GUIDE

(76) Inventor: James Perry Vice, 288 Boeing Ct., Livermore, CA (US) 84551

( * ) Notice: Subject to any disclaimer, the term of this patent is extended or adjusted under 35 U.S.C. 154(b) by 187 days.

(21) Appl. No.: 10/895,753

(22) Filed: Jul. 20, 2004

(51) Int. Cl.
*B27C 5/00* (2006.01)

(52) U.S. Cl. .............................. 144/144.1; 144/144.51; 144/145.1

(58) Field of Classification Search ................ 144/137, 144/144.1, 144.51, 145.1, 145.2, 145.3; 409/125, 409/130; 83/438, 446, 448, 449, 467.1, 468.7, 83/468.2
See application file for complete search history.

(56) References Cited

U.S. PATENT DOCUMENTS

| | | | | |
|---|---|---|---|---|
| 4,742,853 A | * | 5/1988 | Davison | ..................... 144/137 |
| 5,325,899 A | * | 7/1994 | Kochling | .................. 144/144.1 |
| 5,809,631 A | * | 9/1998 | Poulin | ......................... 29/560 |
| 5,893,402 A | * | 4/1999 | Darling | ..................... 144/372 |

* cited by examiner

*Primary Examiner*—Shelley M. Self
(74) *Attorney, Agent, or Firm*—Risto A. Rinne, Jr.

(57) ABSTRACT

An apparatus for cutting a precision dado in a board includes a base member. The base member includes an adjustable clamp that surrounds a guide fence and which can move along the length of the fence. The fence is clamped to the board where desired for each dado. The base member includes a central area that is adapted to receive a dado guide bushing which is attached to a router having a router bit. The central area allows limited movement of the bushing and the router bit in the dado guide perpendicular to the fence. This allows the router bit, which is smaller than the width of the dado, to fully cut the dado in two passes. Setup of the dado guide to accommodate the width of a shelf to be inserted in the dado is described as is the precise location of the dado guide with respect to the board.

20 Claims, 2 Drawing Sheets

DADO GUIDE

BACKGROUND OF THE INVENTION

1. Field of the Invention

The present invention, in general, relates to woodworking tools and, more particularly, to a guide for use with a router in the cutting of a dado.

Routers are used to cut dados, which are essentially channels, in boards for shelves and other similar purposes. It is important to make the dado cut precisely where desired to prevent damage to the board and also to ensure that all parts align, for example, that both sides of a shelf are parallel. This requires precise location of the dados on each side of the shelf.

Prior types of devices used to cut dados are generally referred to as "dado guides." However, prior types of dado guides have certain disadvantages. For example, one such type of product that is available from Accurate Woodworking Tools, LLC, 6991 Hollander Lane, Pickett, Wis., 54964, is referred to as their model "ACCURATE GUIDE."

It relies on a fixture (i.e., the guide portion) that slides along adjacent to a fence. The fence is clamped onto the board to be cut and the fixture is attached to a router by rods that extend away from the fixture. Accordingly, the router is disposed the width of the fixture plus the length of the rods away from the fence.

Two cuts are required for each dado on each board. The first cut is made with the fixture adjacent to the fence. This is difficult because there is no mechanism that ensures the fixture will stay adjacent to the fence. Accordingly, the fixture can pull away from the fence if the user is not careful. One moment of inattentiveness and the board is ruined.

However, there is another substantial disadvantage that occurs when the router is disposed a substantial distance away from the fence. This distance produces a moment arm when pushing on the router with respect to the fence. Accordingly, torque is produced that attempts to twist the fixture relative to the fence (i.e., the router wants to rotate in toward the fence). Absent a mechanism to hold the fixture in position proximate the fence, the fixture can rotate, thereby skewing the cut that is being made and again ruining the board.

If the fixture is adapted to engage with a fence (i.e., to surround a portion of the fence on both sides), then the torque that is produced tends to bind the fixture relative to the fence, making it especially difficult to urge the router along the longitudinal length of the fence.

Another disadvantage with prior art fixtures (dado guides) is that the attachment of the router to the fixture produces a relative, changing, and unpredictable distance between the two. It depends on how deep the rods are attached to the fixture and how deep the rods are inserted into the base of the router itself. There is no fixed distance from the router bit to the fixture. Accordingly, there is no way to determine where the cut will actually occur by use of the fixture. Careful measurement is required which is, at best, a guess that is anything but precise.

A further disadvantage is that after the first cut is made, a piece of scrap wood from the shelf or board that will be placed into the dado must be inserted into the fixture itself. This introduces an offset sufficient to displace the router further away from the fence an amount equal to the thickness of the board that will be inserted into the dado.

There are numerous disadvantages with this approach. The most obvious disadvantage is that there simply may not be a scrap piece of wood available if the entire length of the board placed in the dado is to be used. For example, a person can purchase several three-foot long shelves, already cut, and plan on using them to make a bookcase. There are no scrap pieces available in this instance.

First, the cutting operation must be interrupted (i.e., stopped) in the middle of each dado that is being formed and the fixture adjusted prior to finishing the dado. This is time consuming.

Second, the scrap wood must be inserted into a particular slot depending upon the size of the router bit and the thickness of the dado cut. If the scrap wood is inserted in the wrong slot, a dado that is too large can be produced, thus ruining the entire board (which likely is the side of a bookcase, etc.).

Third, after this adjustment is made, the router is displaced away from the cut that has already been made. If the dado extends from end to end, then there is no problem associated with this displacement. The next cut is made from beyond one end of the board extending past the other end.

However, if the dado is contained within the board (i.e., if it does not extend to the ends of the board), then, after having displaced the router further away from the fence, the new cutting position of the bit will interfere with the wood. This might result in possibly requiring a further changing of bits (i.e., to a new bit that can cut on its bottom) in order to penetrate the wood and allow finishing of the dado, after again changing back to the original bit (that cuts on its circumference, but not on its bottom). This greatly extends time to complete each dado.

There is another problem associated with the use of routers making two passes to cut a dado. The first pass is typically made in a first direction, and the second pass is typically made in an opposite second direction. In one direction, the router bit itself is rotating and tends to pull the router toward the fence. In the opposite direction, the router bit tends to urge the router away from the fence. Motion in either direction can ruin the board that is being cut. This is difficult, especially for unskilled users, in that sufficient skill and anticipation of the router-introduced forces are not yet developed.

Accordingly, there exists today a need for a dado guide that helps ameliorate these disadvantages. Clearly, such an apparatus would be a useful and desirable device.

2. Description of Prior Art

Dado guides are, in general, known and are similar to the above-described device available from Accurate Woodworking Tools, LLC. In general, the router is displaced away from a fence and produces substantial torque when pushed. The cutting procedure for each dado must be interrupted (i.e., it cannot be a continuous operation). Scrap boards are required to adjust the cutting width. A lack of precision in setup, as well as location of the actual dado, is inherent with all known prior art devices.

While the structural arrangements of the above-described devices, at first appearance, may have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a dado guide that is easy to use.

It is also an important object of the invention to provide a dado guide that disposes a router a known predetermined distance away from a fence.

Another object of the invention is to provide a dado guide that disposes a router a minimum distance away from a fence.

Still another object of the invention is to provide a dado guide that allows adjustment of the thickness of the dado without the need for a scrap piece of wood that must be included with the guide during use.

Still yet another object of the invention is to provide a dado guide that allows for adjustment of the thickness of the dado depending upon the size of the router bit.

Another important object of the invention is to provide a dado guide that includes three pins, two of which are inserted into holes that correspond with the size of the router bit and a third that is inserted into a sliding member. The sliding member is adjusted for the distance between the plane of the two pins and the third pin to accommodate the thickness of the board that is to be inserted in the dado.

Yet another important object of the invention is to provide a dado guide that allows for a dado to be cut in two passes in one continuous motion.

A first continuing object of the invention is to provide a dado guide that includes demarcations in the guide that precisely indicate where an inside edge of the dado will be cut.

A second continuing object of the invention is to provide a dado guide that includes demarcations in the guide that precisely indicate where an inside edge of the dado will be cut for a plurality of sizes of dado bits.

A third continuing object of the invention is to provide a dado guide that includes an adjustment suitable for use with a variety of fences, including various manufactured fences.

A fourth continuing object of the invention is to provide a dado guide that minimizes torque when the router is pushed.

A fifth continuing object of the invention is to provide a dado guide that includes friction-reducing material intermediate the guide and a fence.

A sixth continuing object of the invention is to provide a dado guide that permits errors during cutting a dado that do not damage the board being cut.

A seventh continuing object of the invention is to provide a dado guide that permits errors during cutting a dado that do not damage the board being cut. The reason for this is because all extraneous motion by the router bit is maintained (i.e., kept) within the inside and outside edges of the dado that is being cut.

Briefly, a dado guide fixture that is constructed in accordance with the principles of the present invention has a base that includes an adjustment for surrounding a fence sufficient to retain the guide in a fixed position with respect to the fence, allowing the guide to move along the longitudinal length of the fence. A pair of holes is provided, each hole located in an opposite side of the fixture. Each pair of holes is set to correspond with a particular size (i.e., diameter) of any preferred router bit. A pair of pins is each inserted momentarily in one of the pair of holes. A center slot is provided in which a sliding member is adapted to move along a second longitudinal axis perpendicular to that of the fence. The sliding member can be retained in any desired position in the center slot. A hole is provided in the sliding member in which a third pin is momentarily inserted. The board that is to be inserted into the dado is placed between the three pins, and the sliding member is urged toward the two pins until the board is snugly contained therein. The sliding member is retained (i.e., tightened) in that position, and the three pins are removed and, preferably stored, in a receptacle in the guide for future use. A center opening is provided in the guide that includes a known width and length corresponding to the thickness of the desired dado cut in relation to the size of bit that is to be used. The guide is placed over the fence and adjusted for proper fit. A line is visible on each side of the guide that corresponds with an inside edge of the dado that is to be formed. The line is placed over the intended location of the dado's corresponding edge, and the fence is secured adjacent to the work piece (i.e., the board that is to be cut). A router guide bushing is placed over the router that includes a diameter corresponding with the width of the center opening. A first pass is made while holding the router in the center opening and adjacent (i.e., toward) the fence. This is immediately followed by urging the router away from the fence as far as it will go and making a second return pass to complete the cut. If the person erred and allowed the router to wander during either pass, no harm is done. The person just keeps repeating the process until all material is removed.

DETAILED DESCRIPTION OF THE INVENTION

Figure 1:
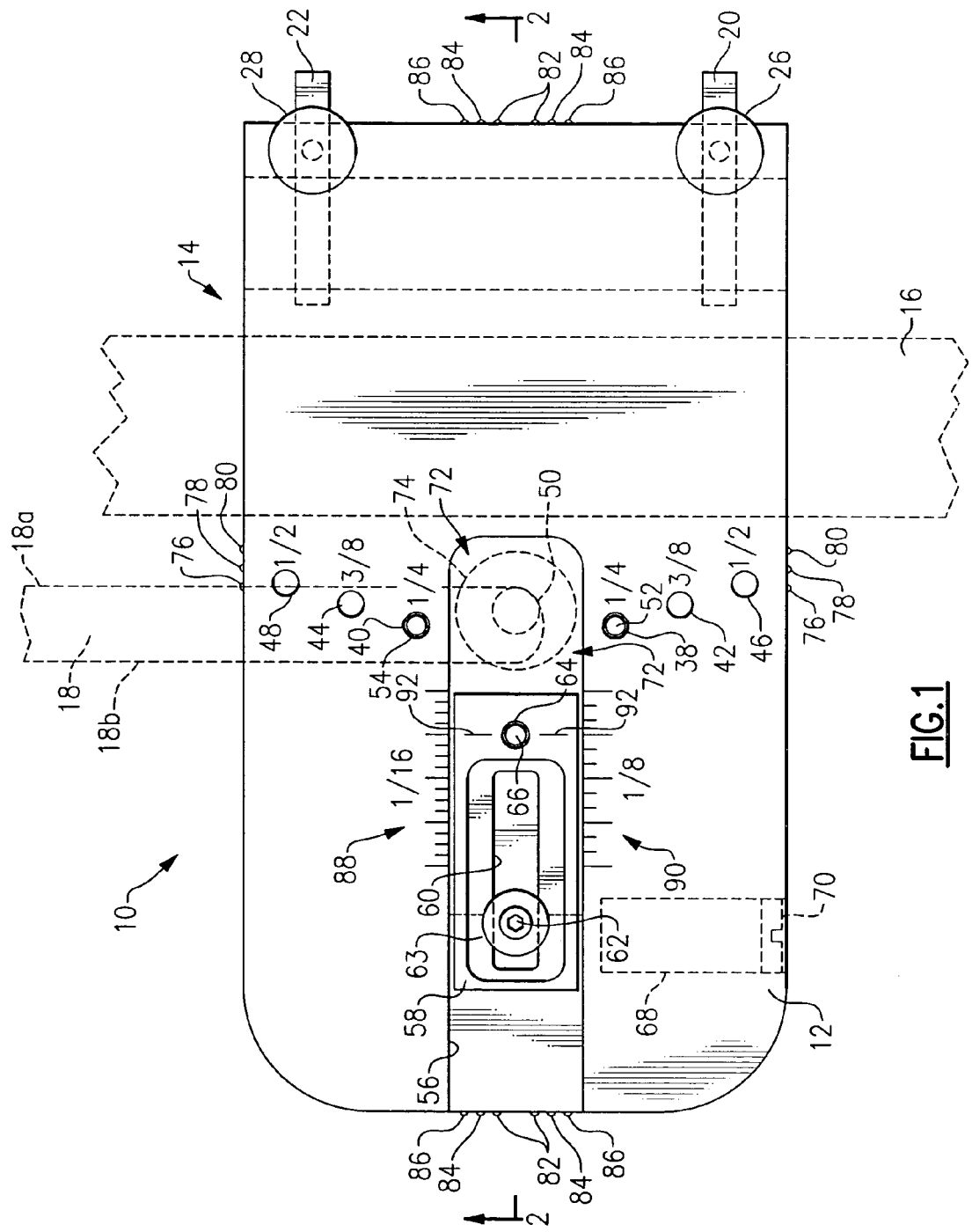
FIG. 1 is a top plan view of a dado guide.
Figure 2:
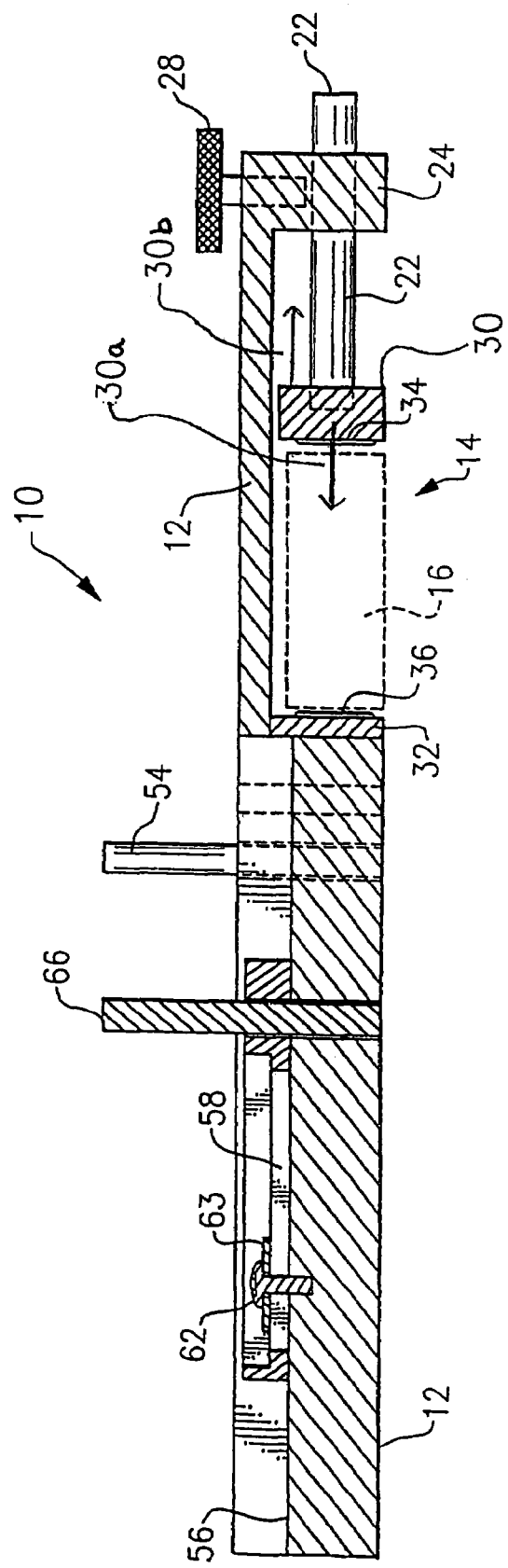
FIG. 2 is a cross sectional view taken on the line 2-2 in FIG. 1, absent the guide bushing and router bit of FIG. 1.

Referring to both FIG. 1 and FIG. 2, a dado guide is shown, identified, in general, by the reference numeral 10.

The dado guide 10 includes a base 12 member that is a substantially planar member. The base 12 includes an adjustable saddle area identified, in general, by the reference numeral 14.

The adjustable saddle area 14 is used to surround a fence 16, shown in dashed lines, on the top and sides. The fence 16 is clamped (not shown) to a board (not shown) that is in parallel planar alignment, immediately underneath both the fence 16 and the dado guide 10. A dado cut 18 (dashed lines) is to be cut into the board. A shelf (not shown) is to be inserted into the dado cut 18. Therefore, it is important that the dado cut 18 be the same width as the thickness of the shelf and located in the board at the proper position.

The adjustable saddle area 14 includes a pair of parallel rods 20, 22 that pass through a pair of parallel rod holes that are provided in an end member 24. The end member 24 is part of the base 12.

A pair of knurled knobs 26, 28 is each attached to screw threads that pass through threaded holes so that an end of the screw thread from one of the knobs 26, 28 bears on one of the rods 20, 22.

An opposite end of each of the rods 20, 22 is attached to a moveable member 30. The moveable member is parallel to the end member 24 and is adapted to move within the saddle area 14 closer to or further away from the end member 24 as shown by arrows 30a and 30b to adapt to the size of the fence 16 that is being used.

Both knobs 26, 28 are loosened, and the rods 20, 22 are fully extended out of the base 12. The saddle area 14 is then placed over the fence 16. The rods 20, 22 are pushed in toward the fence 16 until the moveable member 30 is adjacent to one side of the fence 16, and a fixed interior member 32 is adjacent the opposite side of the fence 16.

A first low-friction strip 34 is attached to the side of the moveable member 30 that is in contact with the fence 16. A second low-friction strip 36 is attached to the side of the fixed interior member 32 that is in contact with the opposite side of the fence 16.

Accordingly, an adjustment for surrounding the fence 16 sufficient to retain the guide 10 in a fixed position with respect to the fence 16 and to allow the guide 10 to move easily along the longitudinal length of the fence 16 is provided that allows the guide 10 to adapt to use with virtually all commercially available fences 16.

A pair of one-quarter inch reference holes 38, 40 is provided on opposite sides of the guide 10.

A pair of three-eight inch reference holes 42, 44 is similarly provided on opposite sides of the guide 10.

A pair of one-half inch reference holes 46, 48 is similarly provided on opposite sides of the guide 10.

Each pair of holes 38-48 is set to correspond with a particular size (i.e., diameter) of any preferred router bit 50 (dashed lines). The one-quarter inch reference holes 38, 40 are used when the router bit 50 is one-quarter of an inch in diameter. The three-eight inch reference holes 42, 44 are used when the router bit 50 is three-eighths of an inch in diameter. The one-half inch reference holes 46, 48 are used when the router bit 50 is one-half of an inch in diameter.

A pair of pins 52, 54 is each inserted momentarily in one of the pair of holes 38, 40 (one-quarter shown), in which the pins 52, 54 fit snugly. If a different router bit 50 size were used, then another of the corresponding pair of holes 42-48 would be used accordingly. The pair of pins 52 54 is used to set the width of the dado cut 18 to match the thickness of the shelf, as is described in greater detail hereinafter. The one-quarter, three-eighth, and one-half inch diameters for the router bit 50 are the most common and, therefore, the guide 10 is adapted for use with these common sizes. Of course, the guide 10 can be adapted for use with other size router bits 50.

A center slot 56 is provided in the base 12 in which a sliding member 58 is adapted to move along a longitudinal axis that is perpendicular to that of the fence 16. The sliding member 58 includes a smaller slot 60 therein that is adapted to receive a retaining screw 62 and a washer 63. The screw 62 engages with screw threads in the base 12 and is tightened in the smaller slot 60 to retain the sliding member 58 in any desired position in the center slot 56.

A hole 64 is provided in the sliding member 58. A third pin 66 is also momentarily inserted in the hole 64 at the same time that the pair of pins 52, 54 is inserted in the pair of holes 38, 40.

The shelf that is to be inserted into the dado cut 18 is then momentarily placed between the three pins 52, 54, 66 on its end (i.e., so that its thickness is between the pins 52, 54, 66). The sliding member 58 is then urged toward the pair of pins 52, 54. The third pin 66 pushes the shelf toward the pair of pins 52, 54 until the shelf is snugly contained therein. The screw 62 is then tightened in the smaller slot 60 sufficient to retain the sliding member 58 in position. The shelf is then removed from the guide 10 as are the pins 52, 54, 66.

It is important to note that the shelf is undamaged by this process. It is likely that the other shelves are also to be used and that the other shelves are of the same thickness. Once the sliding member 58 is secured, the dado guide 10 is set to the proper width for all future dado cuts 18 that are to be made.

The pins 52, 54, 66 are preferably stored in a receptacle 68 that is provided in the base 12 for future use. A threaded cap 70 is used to secure the end of the receptacle 68 and the pins 52, 54, 66 therein. Other variations of the receptacle 68 are anticipated. The pins 52, 54, 66 must be removed prior to forming the dado cut 18 or they would interfere with placement of the router on the dado guide 10, as is described in greater detail hereinafter.

After the sliding member 58 has been secured in the center slot 56, a center opening, identified in general by the reference numeral 72, is provided in the guide 10 that includes a predetermined known width that is equal to the width of the center slot 56 and a length that corresponds to the thickness of the desired dado cut 18 that is derived in relation to the size of router bit 50 that is to be used.

Because the pair of pins 52, 54 is in the pair of holes 38, 40 for a one-quarter inch diameter router bit 50, the rest of the description follows accordingly.

In use, a router guide bushing 74 (dashed lines) is attached to a router (not shown). Different brands of the router require different types of attachment of the guide bushing 74. The most standard guide bushing 74 includes a diameter that is one inch. Accordingly, the width of the center slot 56 is slightly more than one inch, enough to accommodate the guide bushing 74 therein.

The router bit 50 is disposed in a hole in the guide bushing 74 and extends down to a lower elevation than the bottom of the guide bushing 74. The depth that the router bit 50 is below the guide bushing 74 is equal to the desired depth for the dado cut 18.

In use, the guide bushing 74 is placed in the center opening 72 after the depth of the router bit 50 has been set on the router. It is now necessary to determine where to clamp the fence 16 in order to make the dado cut 18 where desired.

A set of three lines, 76 for one-quarter inch, 78 for three-eighth inch, and 80 for one-half inch are provided on each side of the guide 10 and correspond with an inside edge 18a of the dado cut 18 that is to be formed, depending upon the size of the router bit 50. The line 76 that corresponds with the size router bit 50 is placed over the intended location of the dado's corresponding inside edge 18a, and the fence 16 is secured to the work piece (i.e., the board that is to receive the dado cut 18). This allows a positive indication of where the dado cut 18 will occur relative to the dado guide 10.

After turning on the router, a first pass is made while holding the router in the center opening 72 and with the guide bushing 74 held adjacent (i.e., toward) the fence 16, and by moving the dado guide 10 along the side of the fence 16 parallel with a longitudinal axis of the fence 16 until the first pass is completed.

The router is typically grasped and urged in a direction that is parallel to the fence 16 while also applying a slight force tending to keep the router as close to the fence 16 as possible. The dado guide 10 is urged by the guide bushing 74 and glides along the length of the fence 16. The first and second low-friction strips 34, 36 allow the guide 10 to easily slide along the fence 16.

Unlike the prior art versions, the first pass is immediately followed by first urging the router and guide bushing 74 maximally away from the fence as far as it will go in the center opening 72 and making a second return pass to complete the cut.

The entire range of movement permitted for the router (i.e., for the guide bushing 74) is within the length and width of the dado cut 18. The fence 16 retains the dado guide 10, and the center opening 72 retains the range of motion of the router within the dado guide 10. It is actually impossible for a person to make an error in the dado cut 18 after having secured the fence 16 in the desired position and the dado guide 10 to the fence 16.

If, for example, the person erred and allowed the router (i.e., the guide bushing 74) to wander away from either extreme position within the center opening 72 during either the first or the second pass, no harm is ever done. The person just keeps repeating the process (i.e., making the first and second passes) until all of the material is removed by the router bit 50 and the dado cut 18 is complete. The tendency of the router bit 50 to either push or pull the router, depending upon the direction of the pass, is of no concern. No harm can be done.

Accordingly, the person makes the first pass which cuts a portion of the dado cut 18 closest to the inside edge 18a and then urges the router away and makes the second pass that removes the remainder of the material to form the dado cut 18 and to make a second opposite edge 18b. A continuous cutting motion, without the need to turn the router off or to make any adjustments to the dado guide 10, is able to occur, resulting in accurate and fast dado cuts 18.

A second set of three lines, 82 for one-quarter inch, 84 for three-eighths inch, and 86 for one-half inch, are provided on each end of the guide 10 and correspond with the outside diameter of the router bit 50. The second set of three lines 82, 84, 86 are useful in determining when to begin or to end the dado cut 18 if it is not to extend the entire width of the board.

To cut the next dado cut (not shown), the fence 16 is removed and is placed at another location on the board so that the line 76 corresponding with the size router bit 50 is placed over the intended location of the next dado cuts corresponding inside edge. The fence 16 is secured, and the two passes are repeated to form the next dado and so on until all dado cuts 18 have been formed in the board.

Usually, a second opposite board will need similar dado cuts 18 into which opposite ends of the shelves are inserted. Accordingly, the process is repeated to form the dado cuts 18 in the second opposite board as well.

It is also important to note the location of the router with respect to the fence 16. The router is in concentric alignment with the guide bushing 74, and, therefore, a center of the router aligns with a center of the guide bushing 74. For any size of the router bit 50, the guide bushing 74 is disposed as close as possible to the fence 16, separated only by the thickness of the fixed interior member 32 proximate the center slot 56, plus the thickness of the second low-friction strip 36. The thickness of the fixed interior member 32 at the center slot 56 is about one thirty-second of an inch. The thickness of the second low-friction strip 36 is only a few thousandths of an inch.

Accordingly, regardless of the fence 16 that is used or the router bit 50, the router itself is always disposed as close as possible to the fence 16. This minimizes the torque that is produced whenever the router is urged in a direction that is parallel to that of the fence 16. This further reduces friction and helps prevent the guide 10 from binding over the fence 16.

Because the position of the router bit 50 (for any given size of the router bit 50) relative to the dado guide 10 is known, it is possible to include a first set of surface demarcations. These surface demarcations are identified, in general, by the reference numeral 88, and a second set of surface demarcations is identified, in general, by the reference numeral 90 on the surface of the base 12. A reference mark 92 is provided on the sliding member 58.

The first set of surface demarcations 88 includes a first scale, for example, of sixteenths of an inch. The second set of surface demarcations 90 may include a second scale, for example, of eighths of an inch.

The surface demarcations 88, 90 are adapted for use with any diameter of the router bit 50. They indicate how much larger in width the dado cut 18 will be than the diameter of the router bit 50.

If, for example, a one-quarter of an inch in diameter router bit 50 is used, and the reference mark 92 (of the sliding member 56) is set to align with a one-quarter of an inch surface demarcation (either 88 or 90), then the width of the dado cut 18 will be the diameter of the router bit 50 (one-quarter of an inch) plus the additional width provided by the demarcation (another one-quarter of an inch) for a dado cut 18 that is one-half of an inch in width. For different diameter router bits 50, a different diameter of the router bit 50 is added to the demarcation offset.

This is especially convenient when the width of the shelf is known. If a one-half inch thick shelf is to be used, the above example would apply. There is no need to make contact of the shelf with the dado guide 10 in order to set the proper width for the dado cut 18.

The magnitude of demarcation offset is equal to the amount the center opening is longer than it is wide. When the demarcation offset is zero, the center opening is one inch wide and one inch long plus a couple thousandths of an inch to allow for clearance of the one inch guide bushing 74 to enter therein.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A dado guide that is adapted for use with a router having a guide bushing and which is adapted for use with a fence, said dado guide comprising:
   (a) a base member;
   (b) means for securing said base member to said fence wherein said base member is adapted to slide along a longitudinal length of said fence and wherein said base member is prevented from moving closer to or further away from said fence; and
   (c) means for retaining said guide bushing in said base member; and
   (d) wherein said means for retaining said guide bushing in said base member includes providing a center slot in said base member and a sliding member that is adapted to move along a center longitudinal axis thereof in a direction that is perpendicular to a center longitudinal axis of said fence, and including means for securing said sliding member in a predetermined position in said center slot, and wherein said center slot includes a center opening that is open from an upper planar surface of said base member to a lower planar surface of said base member and wherein said center opening includes a width that is equal to a width of said center slot, and wherein said width of said center opening is adapted to allow said guide bushing to enter into said center opening without substantial motion along said width of said center opening and wherein said center opening includes an adjustable length that is determined by the position of said sliding member and wherein said adjustable length is not less than said width of said center slot.

2. The dado guide of claim 1 wherein said means for securing said base member to said fence includes an adjustable clamp that is adapted to secure said base member proximate said fence.

3. The dado guide of claim 2 wherein said adjustable clamp includes a fixed interior member that is rigidly attached to said base member and a moveable member that is in parallel planar alignment with respect to said interior member and including a pair of rods that are each attached at one end thereof to said moveable member and which pass through a pair of holes in an end member, said end member distally disposed with respect to said fixed interior member and wherein said moveable member is disposed intermediate said fixed interior member and said end member and including means for retaining at least one of said pair of rods in a predetermined position with respect to said end member.

4. The dado guide of claim 3 including a first friction-reducing strip that is attached to a side of said moveable member that is closest to said fixed interior member.

5. The dado guide of claim 4 including a second friction-reducing strip that is attached to a side of said fixed interior member that is closest to said moveable member.

6. The dado guide of claim 3 wherein said means for retaining at least one of said pair of rods includes providing a screw in said base member that is adapted to make contact with said at least one of said pair of rods when said screw is sufficiently tightened.

7. The dado guide of claim 1 wherein when said adjustable length exceeds said width of said center slot, said guide bushing is adapted to move toward said fence and away from said fence by an amount that said adjustable length exceeds said width of said center slot.

8. The dado guide of claim 7 wherein a width of a dado that is cut by a router bit is equal to a diameter of said router bit plus said amount that said adjustable length exceeds said width of said center slot.

9. The dado guide of claim 1 wherein said width is equal to one inch.

10. The dado guide of claim 1 including means for determining a width of said dado.

11. The dado guide of claim 10 wherein said means for determining a width of said dado includes providing a reference mark on said sliding member and at least one set of surface demarcations proximate said reference mark and wherein when said reference mark is set to align with one of said surface demarcations, a width of said dado cut is equal to a diameter of said router bit plus an offset amount indicated by said one of said surface demarcations.

12. The dado guide of claim 10 wherein said means for determining a width of said dado includes providing at least one pair of holes in said base member on opposite sides of a center longitudinal axis thereof, wherein said pair of holes are equidistant from an edge of said fence, and wherein said pair of holes are each adapted to receive a pin therein and wherein at least a portion of each pin is adapted to protrude above an upper surface plane of said base member and wherein said sliding member includes a hole therein that is adapted to receive a pin therein and wherein at least a portion of said pin in said sliding member is adapted to protrude above said upper surface plane of said base member and wherein a member that includes a thickness that said dado is required to accept therein is adapted to be placed intermediate said pin in said hole that is disposed in said sliding member and said each pin that is disposed in each of said pair of holes in said base member, and wherein said sliding member is urged toward said pair of holes in said base member until said each pin that is disposed in each of said pair of holes and said pin that is disposed in said sliding member are all in contact with said member, and wherein said sliding member is retained in said position, and said each pin that is disposed in each of said pair of holes and said pin that is disposed in said sliding member are removed from said holes and said member is removed from said guide.

13. The dado guide of claim 12 wherein said at least one pair of holes in said base member corresponds with a particular diameter of a router bit.

14. The dado guide of claim 12 wherein said at least one pair of holes includes a plurality of pairs of holes and wherein each of said plurality of pairs of holes corresponds with a different diameter of a router bit.

15. The dado guide of claim 1 including a line disposed on a side of said base member and wherein said line corresponds to a location on a board where an edge of a dado is cut and wherein said edge is disposed closest to said fence.

16. The dado guide of claim 15 including a plurality of lines disposed in a spaced-apart parallel alignment with respect to each other on a side of said base member, and wherein each of said plurality of lines corresponds to a different location on said board where an edge of said dado will be cut by a plurality of different diameter router bits, each of said plurality of lines corresponding with one of said plurality of different diameter router bits.

17. The dado guide of claim 1 including a first set of lines disposed on an end of said base member and wherein each of said first set of lines corresponds to a location on a board where an edge of a dado is cut and wherein each of said first set of lines corresponds with a diameter of a router bit.

18. The dado guide of claim 17 including a second set of lines disposed on an opposite end of said base member with respect to said first set of lines and wherein each of said second set of lines corresponds to a location on said board where an edge of said dado is cut and wherein said first set of lines and said second set of lines corresponds with a diameter of said router bit.

19. The dado guide of claim 17 including a second set of lines disposed on said end of said base member on an opposite side of a center longitudinal axis of said base member with respect to said first set of lines and wherein each pair of one of said first set of lines and a corresponding one of said second set of lines corresponds with a location on said board where diametrically opposite ends of said router bit are disposed.

20. A dado guide that is adapted for use with a router having a guide bushing and which is adapted for use with a fence, said dado guide comprising:
  (a) a base member;
  (b) means for securing said base member to said fence wherein said base member is adapted to slide along a longitudinal length of said fence and wherein said base member is prevented from moving closer to or further away from said fence; and
  (c) means for retaining said guide bushing in said base member; and
  (d) wherein said means for securing said base member to said fence includes an adjustable clamp that is adapted to secure said base member proximate said fence, and
  (e) wherein said adjustable clamp includes a fixed interior member that is rigidly attached to said base member and a moveable member that is in parallel planar alignment with respect to said interior member and including a pair of rods that are each attached at one end thereof to said moveable member and which pass through a pair of holes in an end member, said end member distally disposed with respect to said fixed interior member and wherein said moveable member is disposed intermediate said fixed interior member and said end member and including means for retaining at least one of said pair of rods in a predetermined position with respect to said end member.

* * * * *